(12) United States Patent
Thisius et al.

(10) Patent No.: US 12,365,465 B2
(45) Date of Patent: Jul. 22, 2025

(54) ONE PIECE SEAT BACK PANEL

(71) Applicant: Textron Aviation, Inc., Wichita, KS (US)

(72) Inventors: Todd Alan Thisius, Cheney, KS (US); Jason Michael Decker, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 150 days.

(21) Appl. No.: 18/456,720

(22) Filed: Aug. 28, 2023

(65) Prior Publication Data

US 2025/0074597 A1    Mar. 6, 2025

(51) Int. Cl.
*B64D 11/06*    (2006.01)

(52) U.S. Cl.
CPC ...... *B64D 11/0639* (2014.12); *B64D 11/0626* (2014.12)

(58) Field of Classification Search
CPC .............................. B60N 2/686; B64D 11/0639
See application file for complete search history.

(56) References Cited

U.S. PATENT DOCUMENTS

| | | | | |
|---|---|---|---|---|
| 8,777,310 B2* | 7/2014 | Westerink | .............. | B60N 3/004 |
| | | | | 297/217.3 |
| 10,220,745 B2* | 3/2019 | Line | .......................... | B60N 2/64 |
| 11,453,320 B1* | 9/2022 | Powell | .................... | B60N 2/803 |
| 2015/0321614 A1* | 11/2015 | Line | ......................... | B60N 2/68 |
| | | | | 297/188.04 |
| 2016/0001689 A1* | 1/2016 | Yasuda | ................. | B60N 2/4228 |
| | | | | 297/391 |
| 2022/0340059 A1* | 10/2022 | Mitsuoka | ................ | B60N 2/686 |
| 2023/0150411 A1* | 5/2023 | Maeda | ...................... | B60N 2/90 |
| | | | | 297/452.18 |

* cited by examiner

*Primary Examiner* — Adam C Ortiz
(74) *Attorney, Agent, or Firm* — SLATER MATSIL, LLP

(57) ABSTRACT

A seat system with a seat back element including a vertical support disposed in a seat back interior region, and one or more first connector portions attached to the vertical support and aligned in a first direction, and a seat back panel having one or more second connector portions attached to an interior surface and configured to connect to the one or more first connector portions. The seat back panel has a first sidewall disposed at a first side and further has a second sidewall disposed on at a second side opposite the first side. The seat back panel has an upper wall portion forming a contiguous first surface with the first sidewall and second sidewall. The second connector portions connect to the first connector portions and attach the seat back panel to the seat back element.

17 Claims, 17 Drawing Sheets

ONE PIECE SEAT BACK PANEL

TECHNICAL FIELD

The present invention relates generally to a system and method for providing a one piece seat back panel, and, in particular embodiments, to a system and method for providing a back cover for a seat system, with the back cover being a one piece seat back panel having one or more releasable attachment mechanisms that affix the seat back panel to a seat frame without fastener openings in the seat back panel, allowing for removal of the seat back panel without tools.

BACKGROUND

Generally, advanced seating systems in vehicles such as aircraft provide multiple mechanisms for manipulating the seat. For example, advanced seating systems may include amenities such as heating or cooling systems in the seat, lumbar support, rotation systems, slide or extensions system, leg rests, entertainment options, power and data outlets, or the like, and may include power or control systems for any, or all, of the amenities. These mechanisms are frequently disposed within the seat, and due to the complexity, may need to be accessed for maintenance, repair, upgrades, and the like.

Frequently, a cover over a portion of the seat is used to permit access to internal systems. Many complex seating structures use multiple panels to cover the seat back. This requires manufacturing, tooling, and finishing of multiple parts, while increasing the number of seams between panels that need to be aligned for a neat aesthetic look. Additionally, multiple panels tend to require multiple fasteners, and in many cases, the fasteners must extend through the seat panels, requiring additional treatment for covering the fasteners.

SUMMARY

An embodiment seat system includes a seat back element including seat back front portion, a vertical support disposed in a seat back interior region, where the vertical support supports the seat back front portion, and one or more first connector portions attached to the vertical support and aligned in a first direction. The seat system further has a seat back panel having one or more second connector portions attached to an interior surface and configured to connect to the one or more first connector portions, where the seat back panel has a first sidewall disposed at a first side and further has a second sidewall disposed on at a second side opposite the first side, where the first sidewall and the second sidewall each extend away from an interior surface of the seat back panel, where the seat back panel further has an upper wall portion disposed at a third side between the first sidewall and the second sidewall and forming a contiguous first surface with the first sidewall and second sidewall, where the first side, the second side, the third side, and a lower edge portion bound a center portion of the seat back panel, where the contiguous first surface and the center portion form a contiguous second surface that is free of openings and that at least partially bounds an interior cavity of the seat back panel. The second connector portions are configured to connect to the one or more first connector portions to attach the seat back panel to the seat back element with at least a portion of the vertical support in the interior cavity of the seat back panel.

An embodiment seat back panel includes a center portion, mounting surfaces disposed on an interior surface of the center portion, a first sidewall disposed at a first side of the center portion, a second sidewall disposed at a second side of the center portion opposite the first side, where the first sidewall and the second sidewall each extend away from the interior surface of the seat back panel, an upper wall portion disposed at a third side of the center portion and between the first sidewall and the second sidewall and forming a contiguous first surface with the first sidewall and second sidewall, where the first side, the second side, the third side, and a lower edge portion of the center portion bound the center portion, where the contiguous first surface and the center portion form a contiguous second surface that is free of openings and that at least partially bounds an interior cavity disposed at the interior surface, and connector portions of attachment structures attached to the mounting surfaces and configured to connect to respective receiver portions of the attachment structures disposed on a seat structure to attach the seat back panel to a seat back element of the seat structure with at least a portion of a vertical support of the seat structure in the interior cavity of the seat back panel.

An embodiment method for installing a seat back panel includes providing a seat back panel having mounting surfaces disposed on an interior surface of a center portion of the seat back panel, and further having connector portions of attachment structures attached to the mounting surfaces and configured to connect to receiver portions of the attachment structures disposed on a seat structure, where the seat back panel further has a first sidewall disposed at a first side of the center portion, where the seat back panel further has a second sidewall disposed on at a second side of the center portion the opposite the first side, where the first sidewall and the second sidewall each extend away from the interior surface of the seat back panel, where the seat back panel further has an upper wall portion disposed at a third side of the center portion and between the first sidewall and the second sidewall and forming a contiguous first surface with the first sidewall and second sidewall, where the first side, the second side, the third side, and a lower edge portion of the center portion bound the center portion, where the contiguous first surface and the center portion form a contiguous second surface that is free of openings and that at least partially bounds an interior cavity disposed at the interior surface, aligning the seat back panel with the seat structure and with each connector portion of the connector portions aligned with a respective receiver portion of the receiver portions, and attaching the seat back panel to a seat back element of the seat structure by moving the seat back panel to the seat back element and causing the connector portions to engage with the receiver portions, and where the connector portions engaging with the receiver portions causes the receiver portions to latch the connector portions and retain the seat back panel on the back of the seat back element with at least a portion of the seat back element in the interior cavity of the seat back panel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
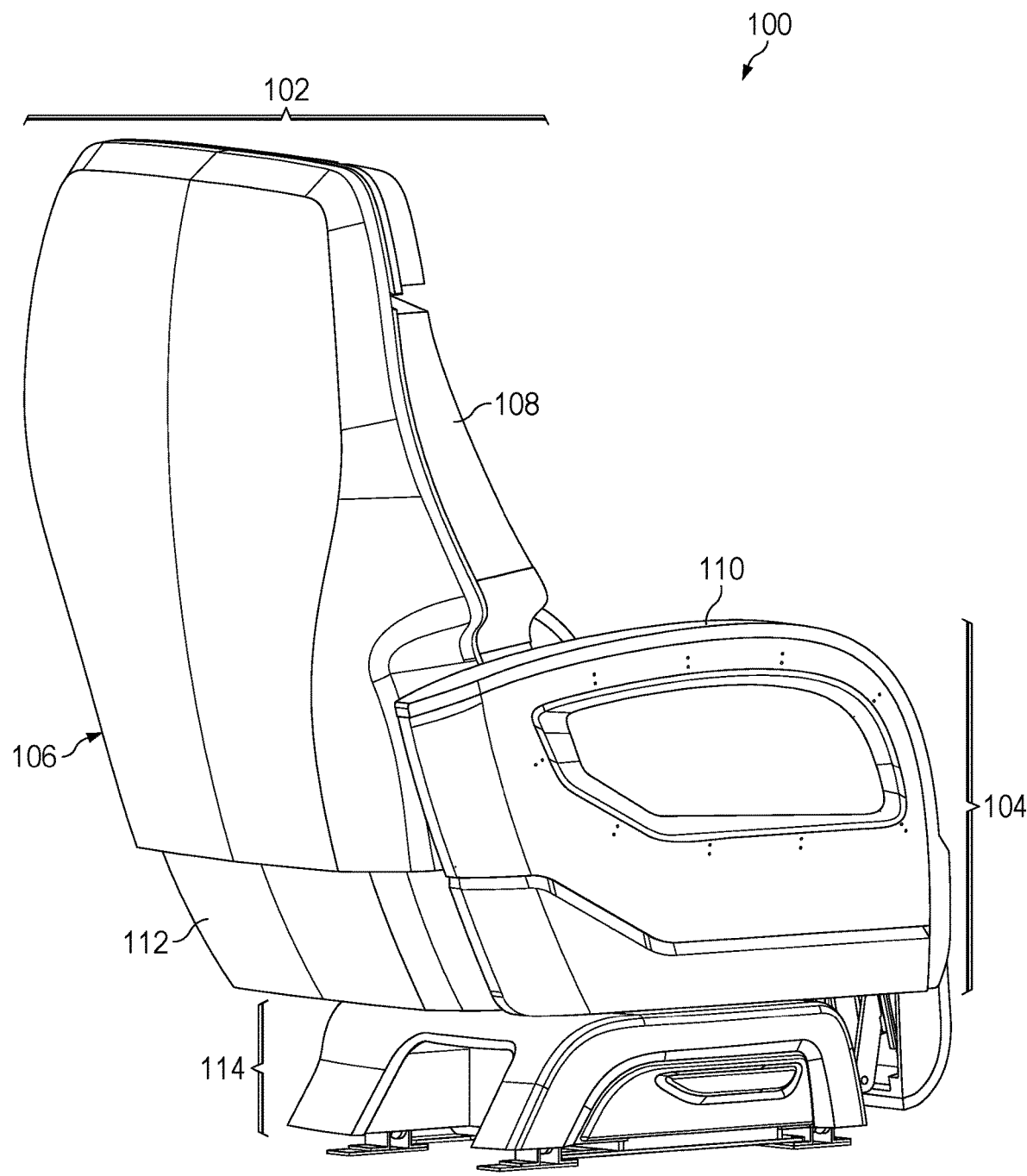
FIGS. 1A-1B are perspective views illustrating a seat system according to some embodiments.
Figure 1B:
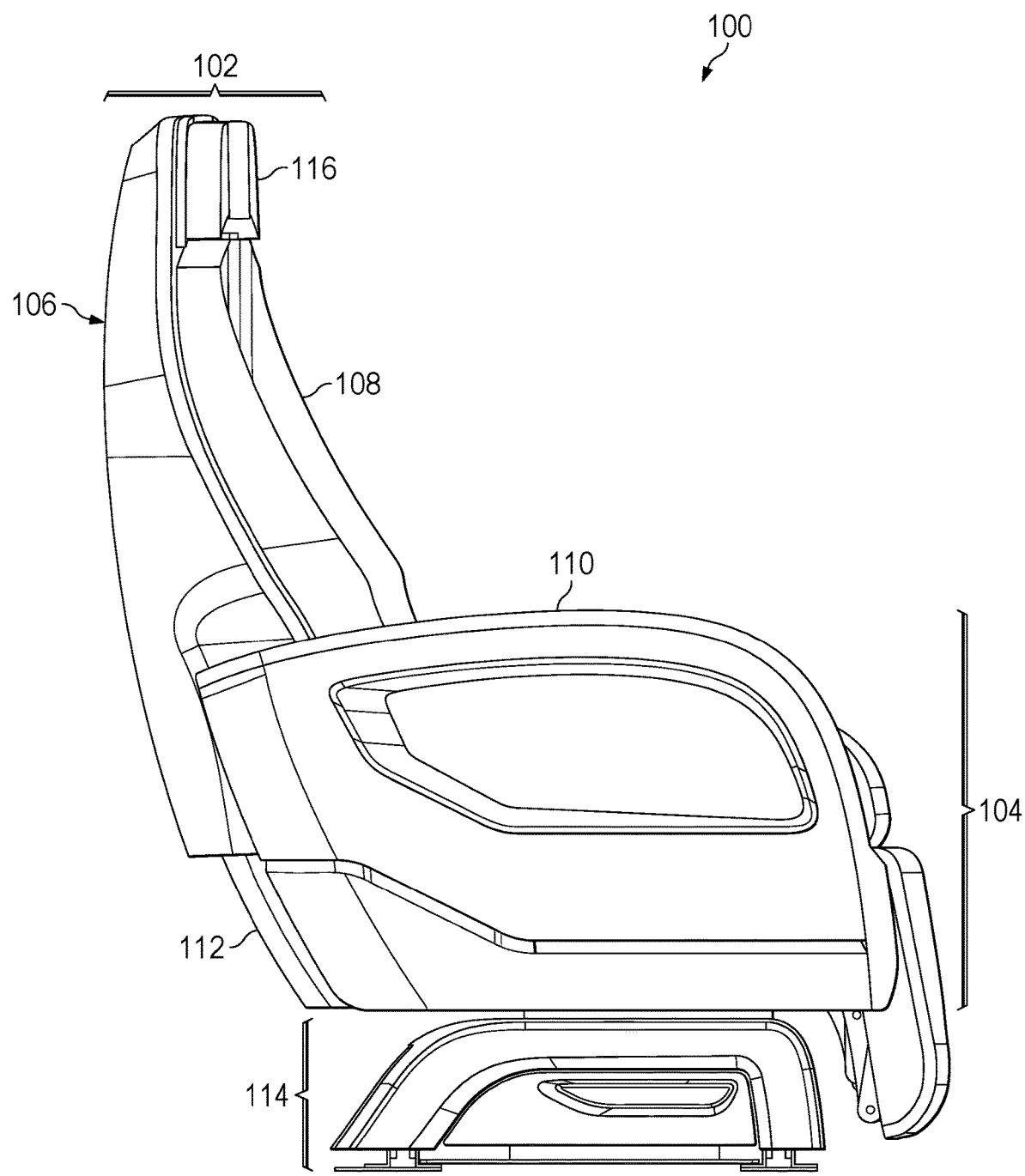

Described herein are embodiments for providing a one piece seat back panel for a seat system. The one piece design allows for improved aesthetics of a seat back, while single part removal provides access to all back structures, and to internal structures and components. The one piece seat back panel may, in some embodiments, have integrated attachment positioning that creates a tight-fitting part that is receptive to design feature integration. Additionally, the attachment elements may be internal, so that the outer surface of the seat back panel is substantially contiguous without screws, attachment points, openings, or other interruptions in the seat back panel. Thus, the seat back panel may be configured for removal without tools. The seat back panel may be significantly larger than prior similar parts, as the single piece set back panel may be used in place of multiple smaller panels. Additionally, in some embodiments, the edges of the seat back panel are tooled, and may be fitted to a seat system, structure or arrangement so that coverings may be wrapped around the seat back panel with the edges of the covering inside the seat. Thus, the seat back panel may be a one piece precision tooled seat back panel that creates an aesthetically pleasing close out for the back of a seat system. Additionally, removal of this single part allows access to structure and components located in the seat back FIGS. 1A-1B are perspective views illustrating a seat system 100 according to some embodiments. FIG. 1A is a perspective view illustrating a quarter view of the back and side of a seat system 100. FIG. 1B is a perspective view illustrating a side view of the seat system 100. In some embodiments, the seat system 100 may be a largely self-contained unit that is bolted to, for example, the interior of an aircraft, bus, recreational vehicle, train, car, or the like. The seat system 100 may have a base 114 or pedestal that the rest of the seat system 100 is attached to, and the base 114 may have attachment points for attaching the seat system 100 to a substrate structure or supporting structure, such as a floor. The base 114 permits the body of the seat system 100 to be rotated or laterally moved.

The seat system 100 may have a seat back element 102 and seating surface element (not shown). The seat back element 102 and seating surface element may have contact surfaces where an occupant makes contact with the seat system 100 when sitting in the seat system 100. The seat back element 102 may have a seat back front element 108 that is padded, contoured or covered to provide support and comfort for an occupant, and to support an occupant's back when in the seat system 100. The back portion of the seat back element 102 may have a seat back panel 106 that covers the back of the seat back element 102. The seat back panel 106 is, in some embodiments, a single piece that is removable from the seat back element 102 without tools, but that securely attaches to the seat back element 102 to retain the seat back panel 106 securely when the seat back element 102 is reclined or the seat system 100 is rotated or moved. The seat back panel 106 may be disposed on the seat back element 102. The seat system 100 may have a lower back panel 112 that is attached to a fixed or non-reclining portion of the seat system 100, and may be spaced apart from the lower back panel 112 so that, when the seat back element 102 is reclined, the seat back panel 106 moves over the lower back panel 112 without contacting the lower back panel 112 to avoid the seat back panel 106 scraping the lower back panel 112 or other otherwise avoids interference with the lower back panel 112.

The seat system 100 may also have one or more armrest elements 104 with armrest top features 110. The arm rests are disposed adjacent to the seating surface element, and the seat back element 102 may be shaped to accommodate the armrest elements 104. For example, the seat back element 102 may have a lower portion that is narrowed to pass between armrest elements 104, and a top portion that is wider to provide greater support for an occupant. Thus, a seatback extension region may extend over the armrest top features 110. The seat back panel 106 may also have the extension region, and may have a lower portion narrower than the middle portion, which may include the extension regions.

Figure 2:
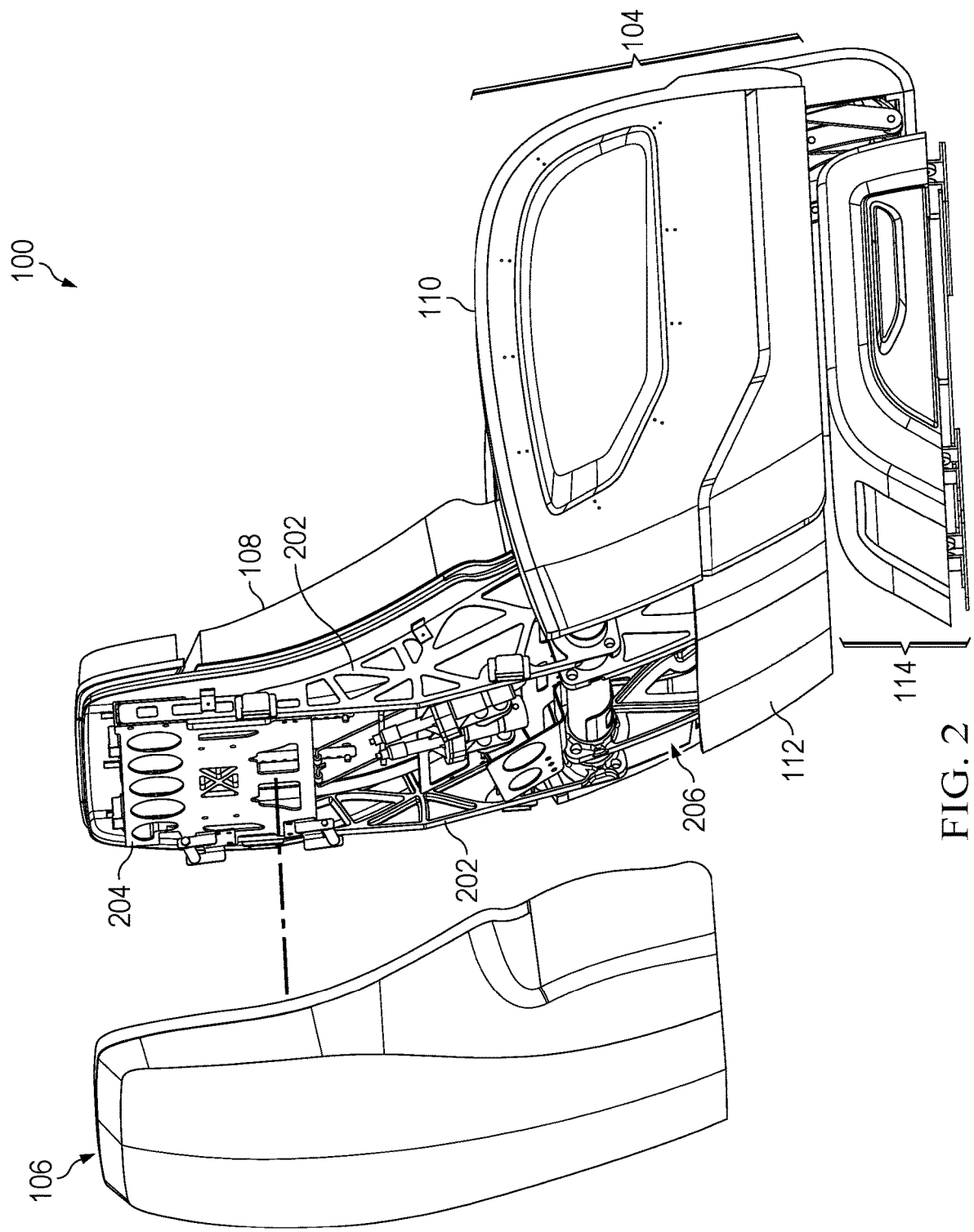
FIG. 2 is an exploded view of a seat system with a seat back panel removed according to some embodiments.

FIG. 2 is an exploded view of a seat system 100 with a seat back panel 106 removed according to some embodiments. The seat back panel 106 includes a seat back interior region 206 that may, in come embodiments, include one or more vertical supports 202 and one or more lateral supports 204. The vertical supports 202 and lateral supports 204 may be attached to each other to form a support frame for the seat back element 102, and to which internal mechanisms, exterior pieces, such as the seat back panel 106 and seat back front element 108, may be attached. In some embodiments, the armrest elements 104 extend back to cover at least a portion of the vertical supports 202, but may be separate from, or not attached to, the vertical supports 202 to permit the seat back element 102 to be reclined without interference from the armrest elements 104. Additionally, the vertical supports 202 may be attached to a lower frame or other element, by a rotating connection or hinge connection to control and permit the seat back element 102 to recline. The lower frame may be attached to the base 114 to permit the seat back element 102 to be securely, and reclineably, attached to the base and the remainder of the seat system 100.

Figure 3A:
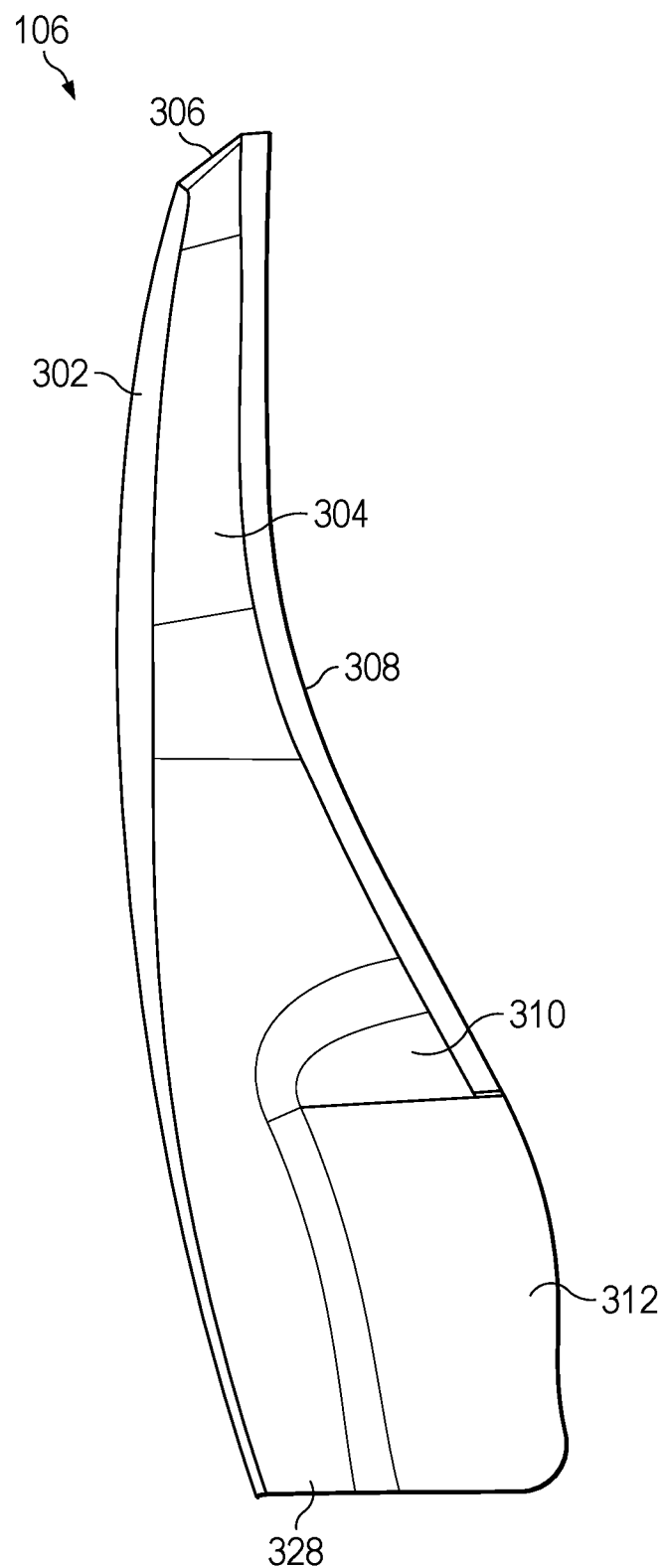
FIGS. 3A-3F are perspective views of a seat back panel according to some embodiments.
Figure 3B:
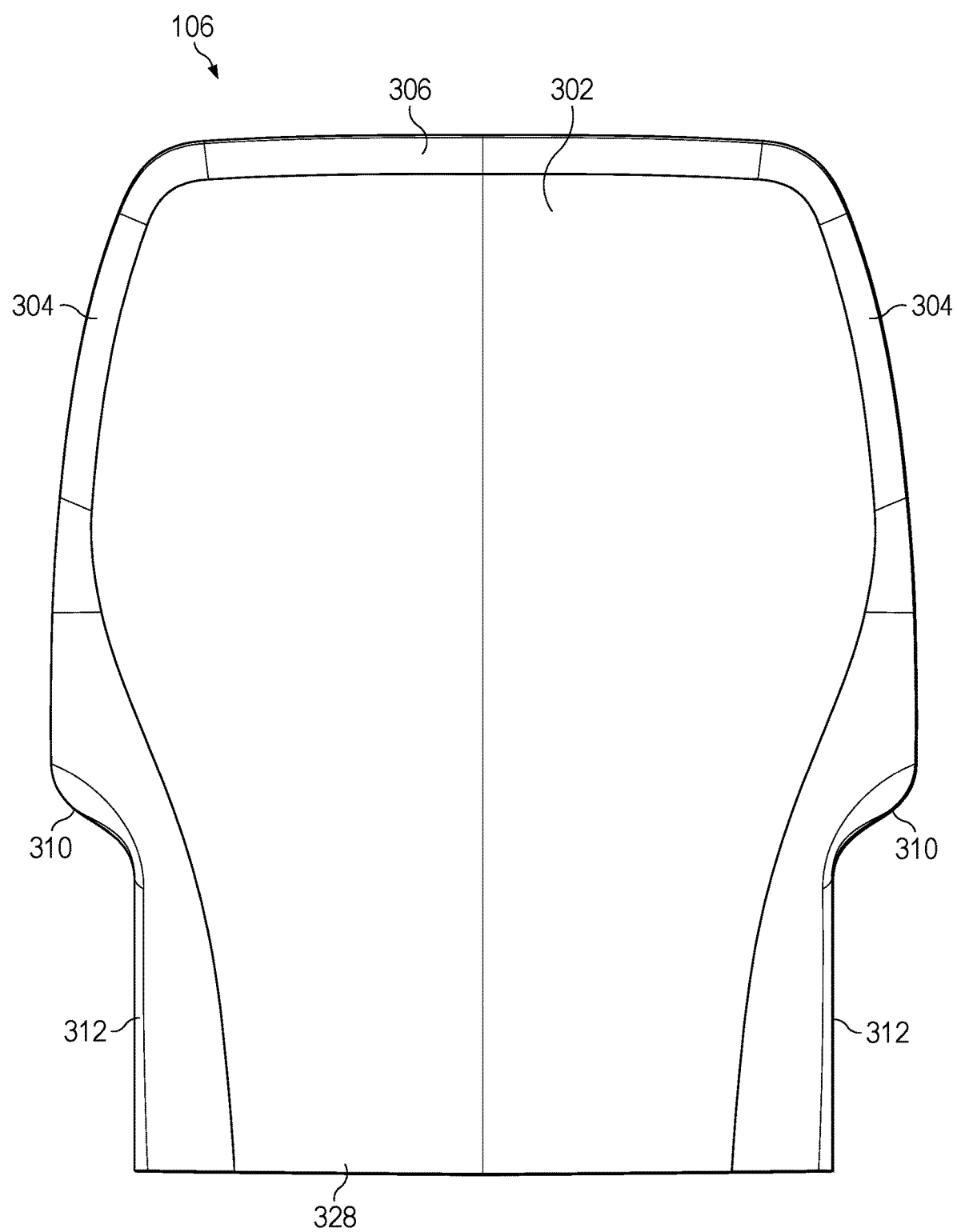

FIGS. 3A-3F are perspective views of a seat back panel 106 according to some embodiments. FIG. 3A is a perspective view of the side of the seat back panel 106 according to some embodiments. FIG. 3B is a perspective view of the back or outer surface of the seat back panel 106 according to some embodiments. The seat back panel 106 may have a center portion 302 that extends contiguously and laterally between opposite sidewall portions 304, and that extends contiguously and vertically between an upper wall portion 306 and a lower edge portion 328. Each sidewall portion 304 may contiguously extend along the center portion 302 from the upper wall portion 306 toward the lower edge portion 328. The sidewall portions 304 may be bounded by the center portion 302, and a front edge portion 308. In some embodiments, each sidewall portion 304 may have an extension region 310 and may extending inward at or below the extension region 310 to form a lower portion that is narrower than the middle portion. Lower sidewall portions 312 may bound the lower portion of the seat back panel 106, and may extend from the extension region 310 to the lower edge portion 328.

Figure 3C:
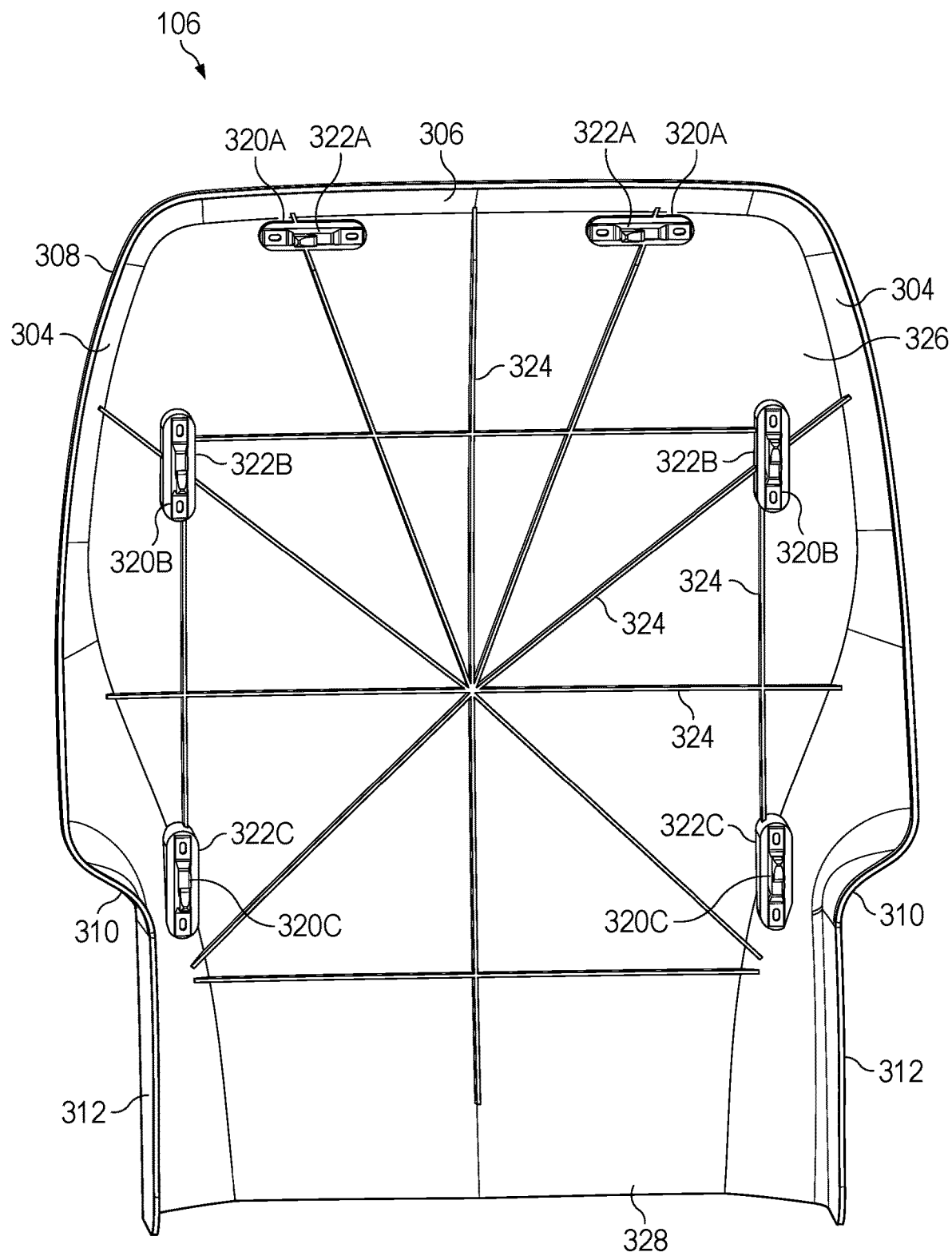
Figure 3D:
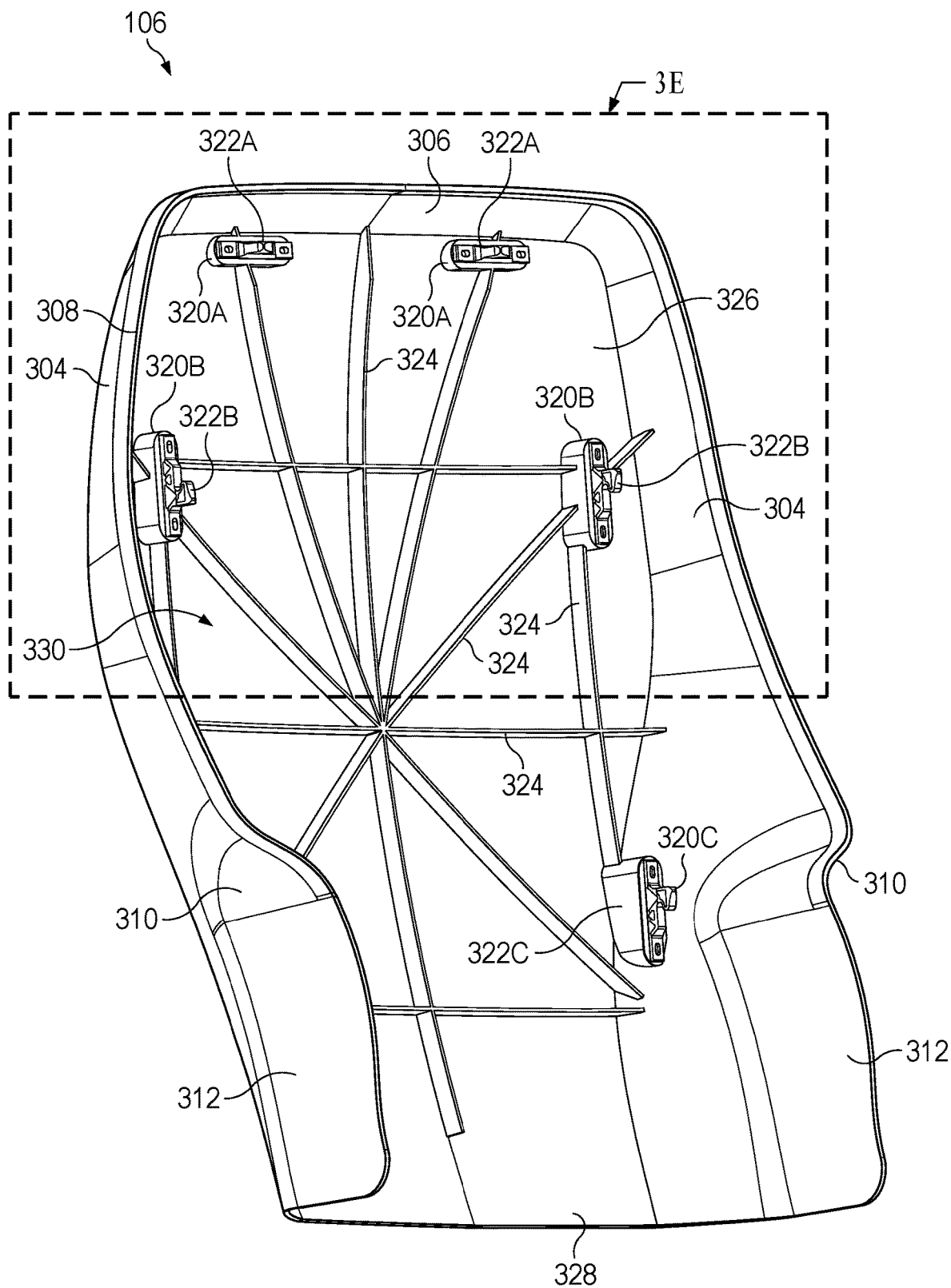
Figure 3E:
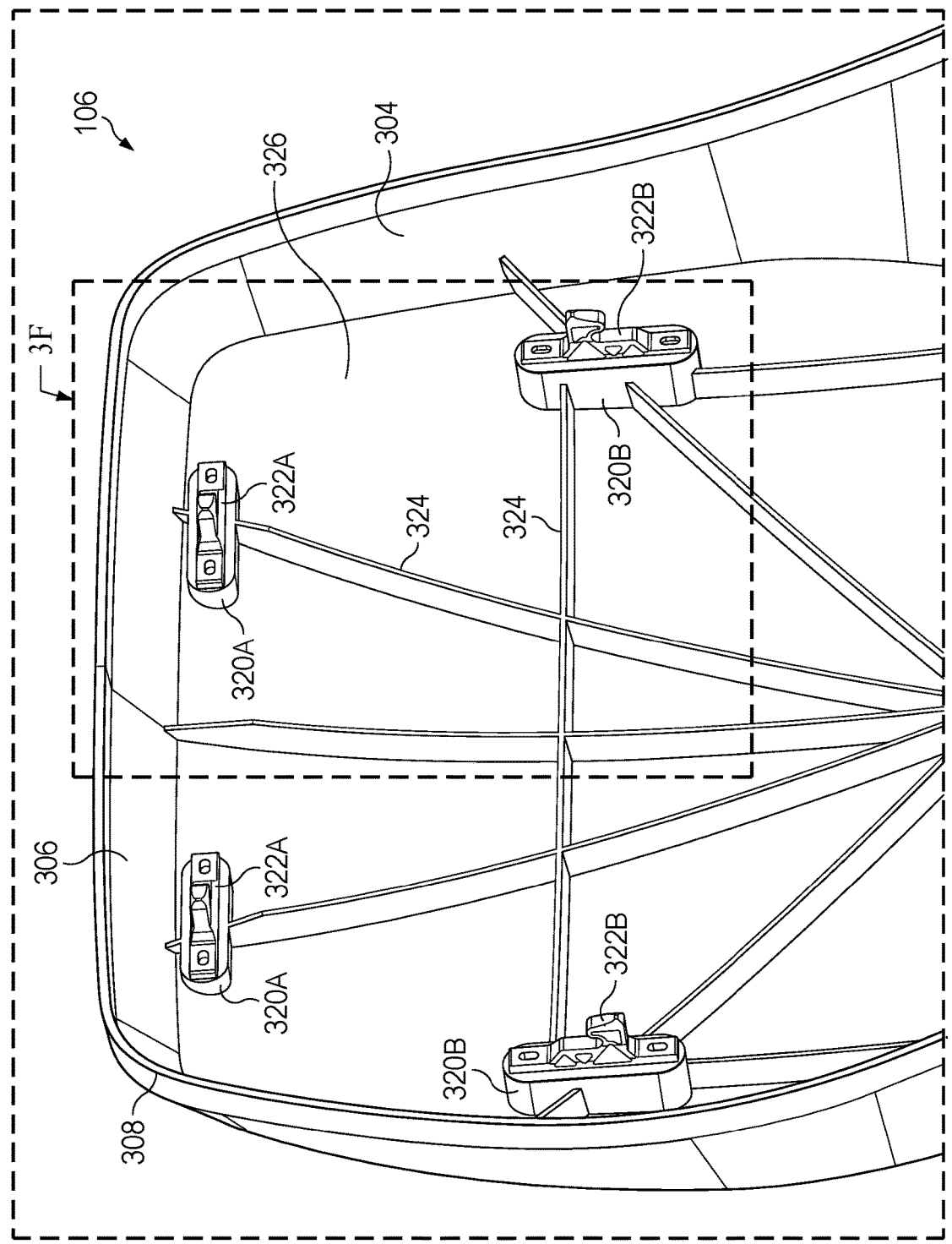
Figure 3F:
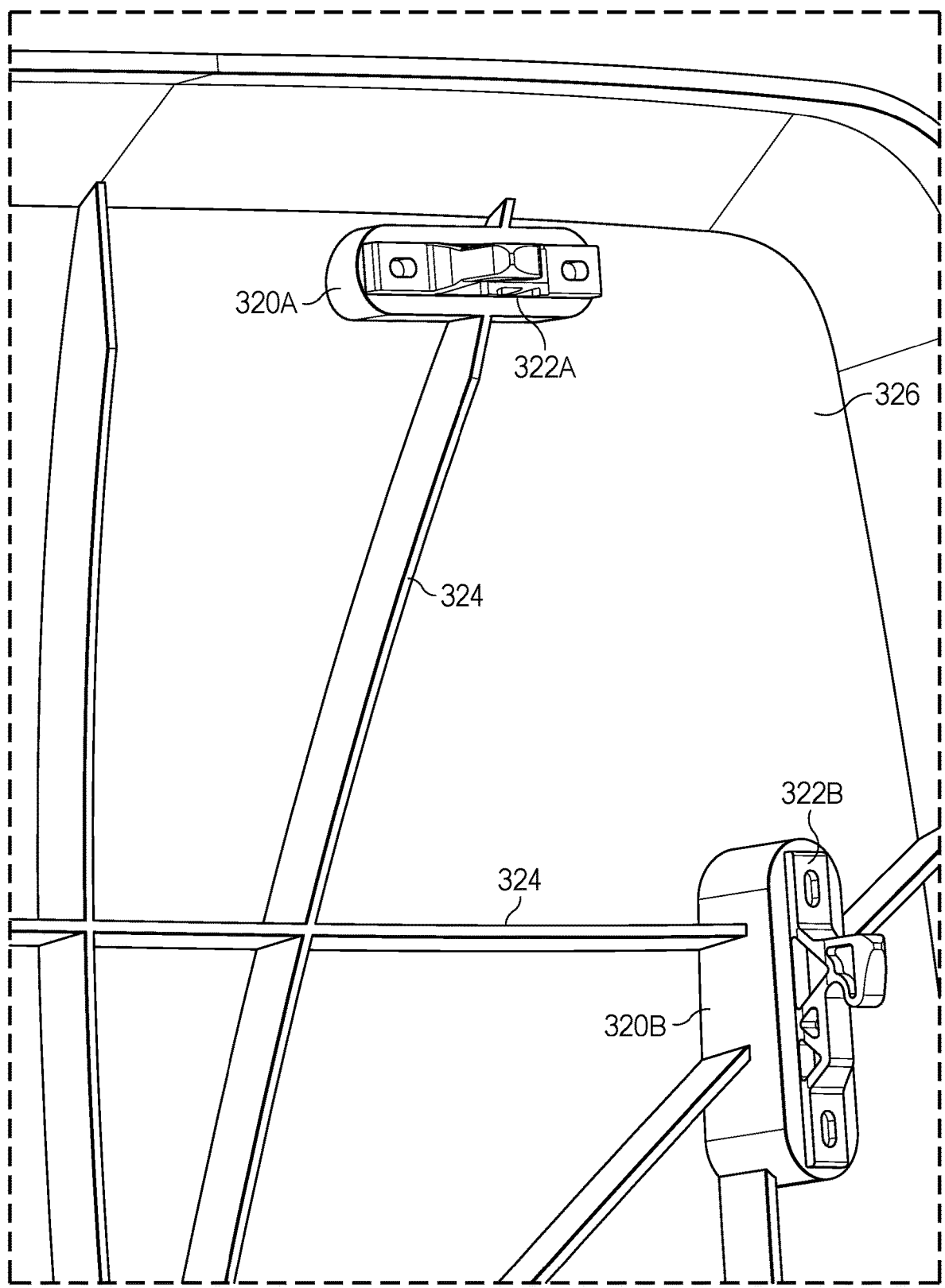

FIG. 3C is a perspective view illustrating the front of the seat back panel 106 according to some embodiments. FIG. 3D is a perspective view illustrating a three quarter view of the front of the seat back panel 106 according to some embodiments. FIGS. 3E and 3F are perspective views illustrating enlarged three quarter views of connector portions 322A-322B disposed in the seat back panel 106 according to some embodiments. The seat back panel 106 may have an interior surface 326 that is bounded by the sidewall portions 304 and the upper wall portion 306 to form an interior cavity 330.

One or more connector portions 322A-322C, supporting features 324, and mounting features 320A-320C may be disposed on the interior surface 326 within the interior cavity 330. In some embodiments, the seat back panel 106 may have one or more supporting features 324 that extend across the interior surface 326 to stiffen or support the center portion of the seat back panel 106. In some embodiments, the supporting features 324 may be ribs or the like that are molded into the seat back panel 106. Additionally, the supporting features 324 may extend across the interior surface 326 and may contact or support the sidewall portions 304 or upper wall portion 306. One or more supporting features 324 may extend in different directions to provide additional stiffness to the seat back panel 106, and may cross or touch each other, or touch one or more mounting features 320A-320C to support or stiffen the mounting features 320A-320C.

In some embodiments, the seat back panel 106 includes mounting features 320A-320C, such as bosses or other features, where connection features, such as connector portions 322A-322C, can be mounted. For example, in some embodiments, the mounting features 320A-320C may be bosses that are integrally formed in the seat back panel 106, and extend from the interior surface 326 into the interior cavity 330. In such an arrangement, each of the bosses may have flat faces that act as mounting surfaces and that face the front edge portion 308, and may be formed as part of a molding, casting or other formation process. For example, the seat back panel 106 may be injection molded from a thermoplastic such as polyvinyl chloride (PVC), high density polyethylene (HDPE), polycarbonate, nylon, or the like, and the mounting features 320A-320C may be molded into the seat back panel 106 as part of the injection molding process. In another example, the seat back panel 106 may be molded or laid up using a laminate such as carbon fiber, fiberglass, or the like, and the mounting features 320A-320C may be molded into the seat back panel material, or inserted into the seat back panel material during the laminating process. In other embodiments, the mounting features 320A-320C may be flat surfaces that are formed directly on the interior surface by, for example, molding flat surfaces into the interior surface 326, or machining, milling, or otherwise forming flat surfaces on the interior surface 326 after the interior surface 326 is formed. In other embodiments, the mounting features 320A-320C may be brackets, posts, or other features that are attached to the interior surface 326 after the interior surface 326 is formed. In some embodiments, the mounting features 320A-320C may be provided throughout the interior cavity 330 to provide support to various parts of the seat back panel 106. Additionally, the seat back panel 106 may be between about 24 inches high and about 36 inches high, and in some embodiments, may be about 30 inches high. The seat back panel 106 may also be between about 18 inches wide and about 28 inches wide, and in some embodiments, may be about 22 inches wide.

In some embodiments, the mounting features 320A-320C provide a surface for mounting the connector portions 322A-322C. In some embodiments, the connector portions 322A-322C may each be part of a connector structure such as a male portion of a grabber catch, that is face mounted to a surface of a respective mounting feature 320A-320C. A grabber catch may be, for example, an over-center cam latch mechanism that allows for straight-in insertion of the connector portion into a receiver portion (not shown, see FIGS. 4A-4E, 5, 6A-6B) of the connector structure. The connector portions 322A-322C of the grabber catch may be configured to be inserted into, and retained, by a catch mechanism in a receiver portion of the connector structure.

In some embodiments, the seat back panel 106 may have at least one upper mounting feature 320A with at least one upper connector portion 322A, at least one middle mounting feature 320B with at least one middle connector portion 322B, and at least one lower mounting feature 320C with at least one lower connector portion 322C. In some embodiments, the lower connector portions 322C are disposed between, or directly between the extension regions 310, and may be disposed at the top of the lower sidewall portions 312.

In some embodiments, at least one of the mounting features 320A-320C and associated connector portions 322A-322C have a different orientation than the other mounting features 320A-320C and associated connector portions 322A-322C. For example, the upper connector portions 322A may be aligned with a long axis that extends laterally, or from toward one sidewall portion 304 towards the opposite sidewall portion 304, while the middle connector portions 322B and lower connector portions 322C have long axes that extend substantially vertically, from nearest the upper wall portion 306 toward the lower edge portion 328.

Figure 4A:
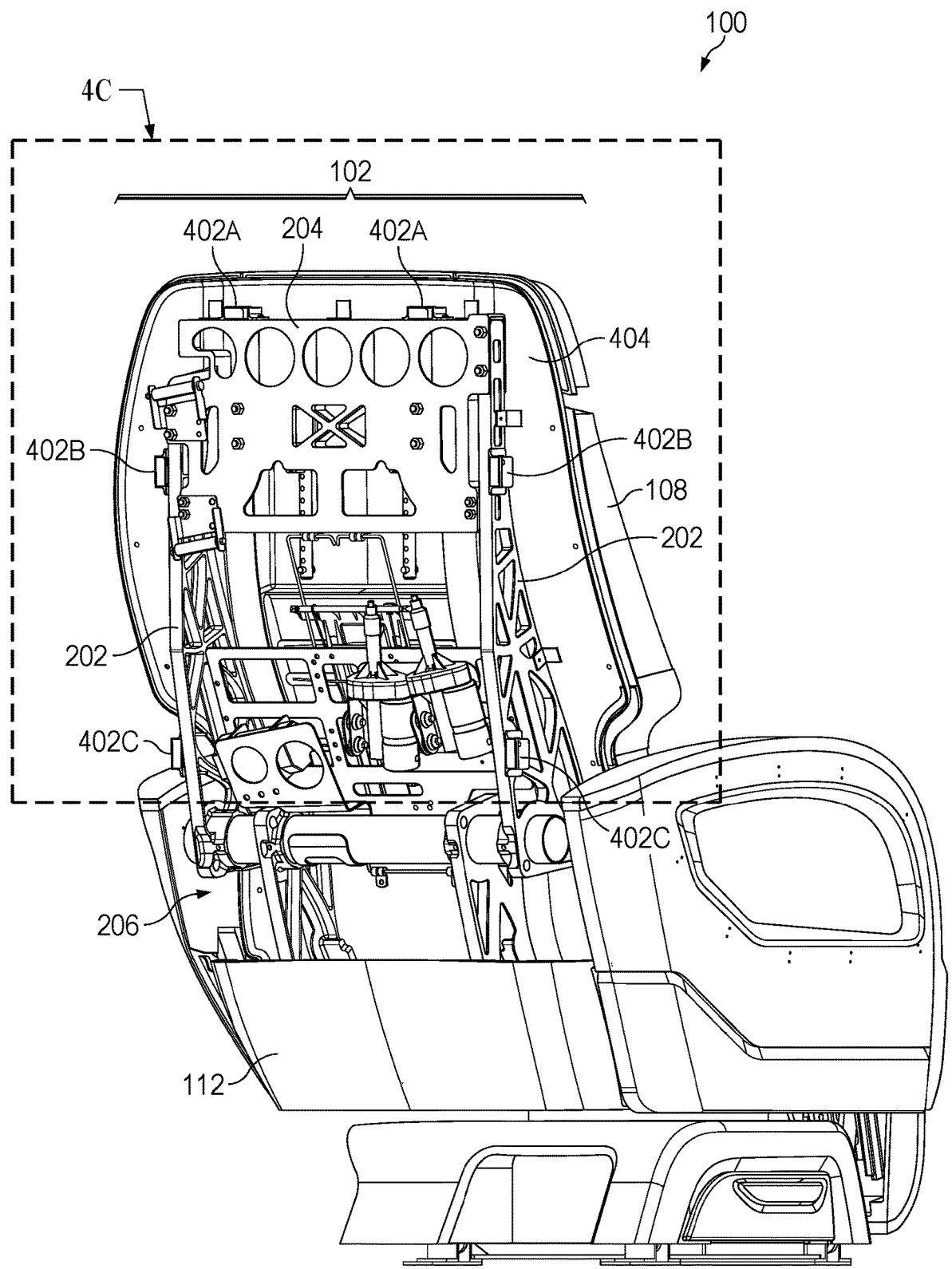
FIGS. 4A-4E are interior views of a seat system according to some embodiments.
Figure 4B:
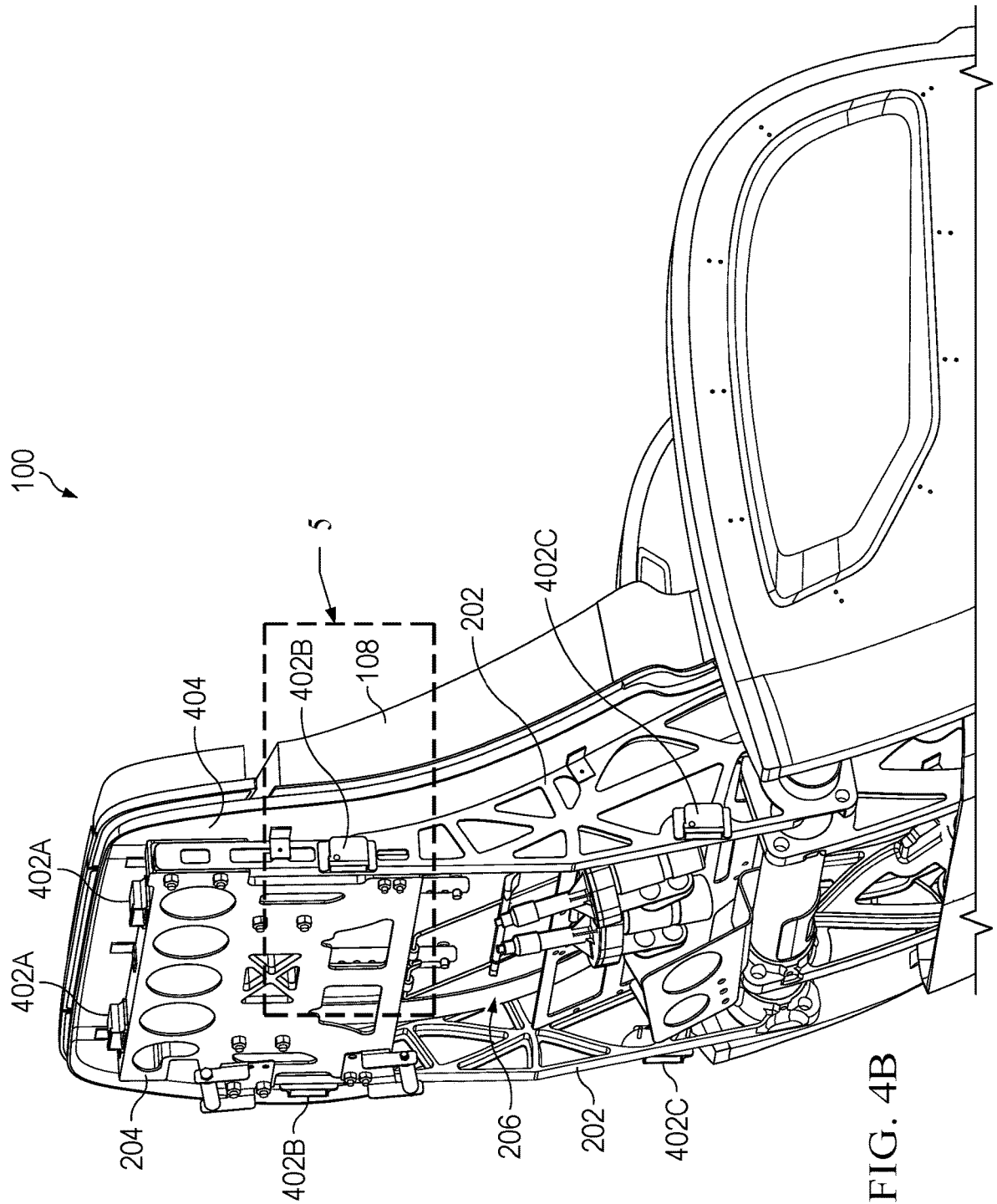

FIGS. 4A-4E are interior views of a seat system according to some embodiments. FIGS. 4A and 4B are perspective views of the seat back interior region 206 of the seat system 100 according to some embodiments. The seat system 100 may have, within the seat back interior region 206, a lateral support 204 disposed between, and connecting, opposing vertical supports 202. The seat system 100 may have a seat support surface 404 attached or mounted to the vertical supports 202 or the lateral support 204, with the seat back front element 108 attached to, and supported by, the seat support surface 404. One or more upper receiver portions 402A may be disposed on the lateral support, and one or more middle receiver portions 402B and lower receiver portions 402C may be disposed on the vertical supports 202. In some embodiments, the lateral support 102 may be a structure that extends from over back surfaces of the vertical supports 202 and over top surfaces of the vertical supports 202 to form a top surface of the lateral support 204, with the upper receiver portions 402A disposed on the top surface of the lateral support 204. In some embodiments, the vertical supports 202 and lateral support 204 may be formed from, for example, aluminum, steel, or another metal, may be molded from a polymer, machined, molded or laid up using laminate material, or formed from another process using a material suitable for supporting the seat back element 102. Additionally, the vertical supports 202 may be integral with the lateral support 204, and may be formed as a single piece during manufacturing, or may be separate pieces with the lateral support 204 attached directly to the vertical supports 202, or attached to an intermediary piece that retains the lateral support 204 in position with respect to the vertical supports 202.

Figure 4C:
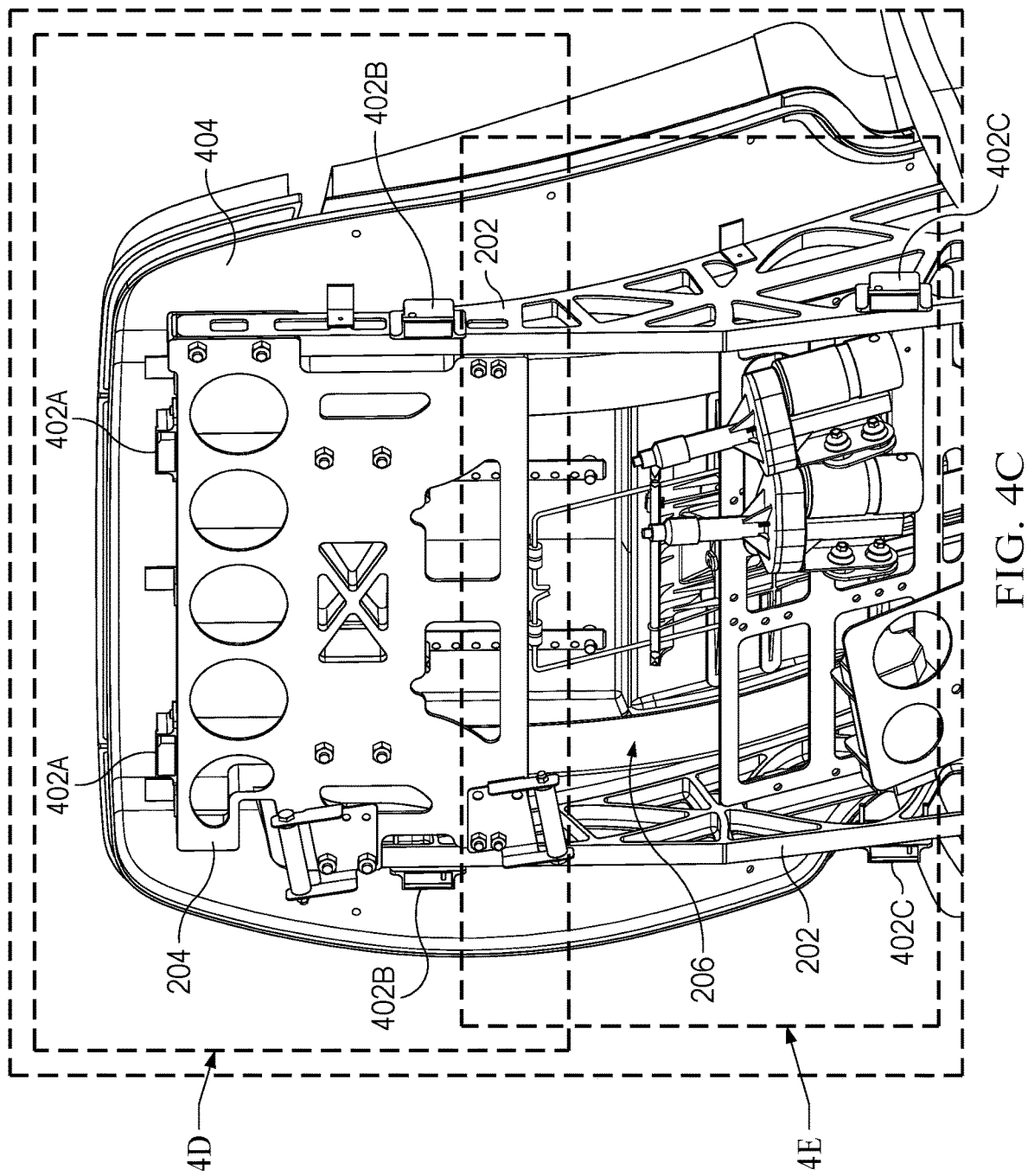
Figure 4D:
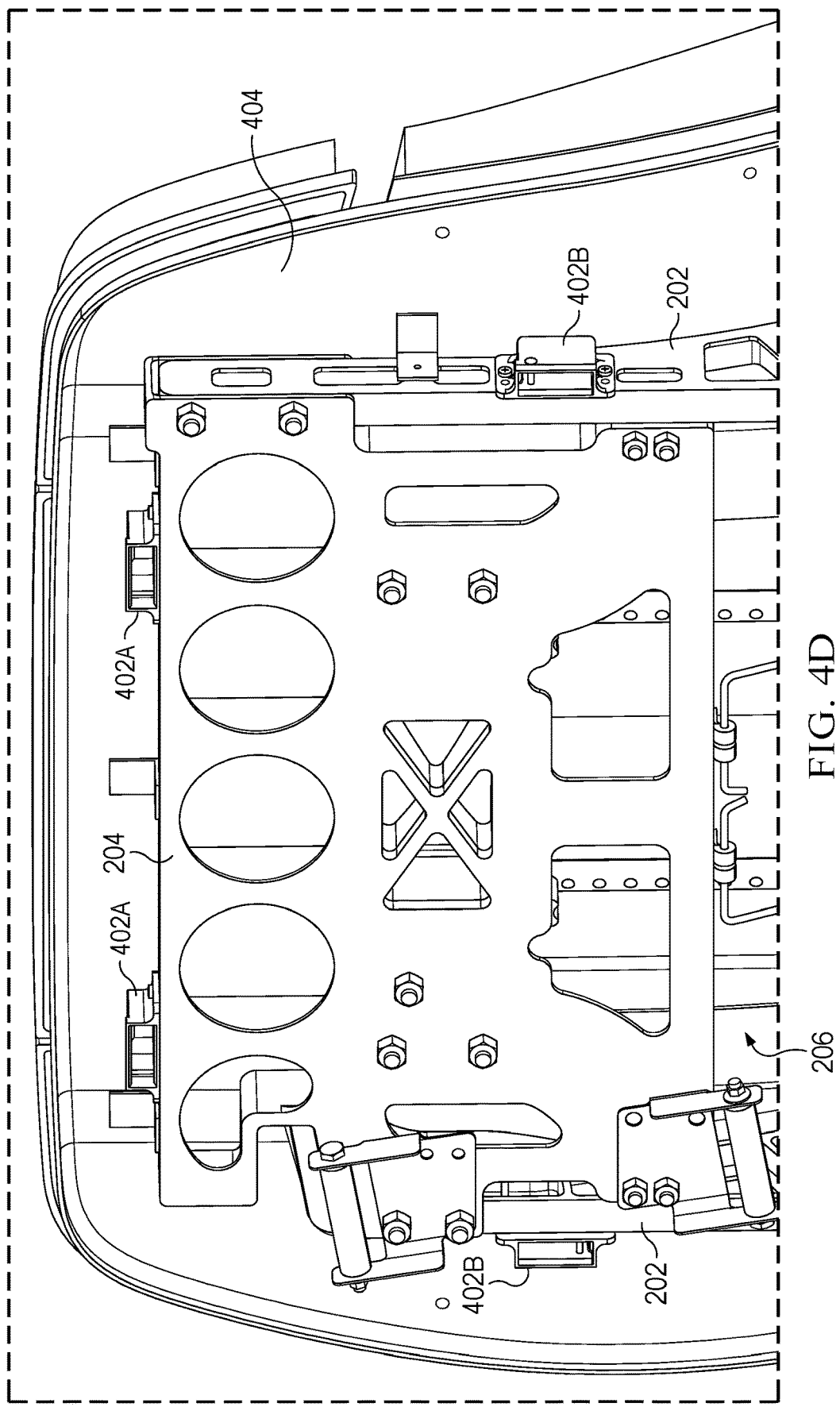
Figure 4E:
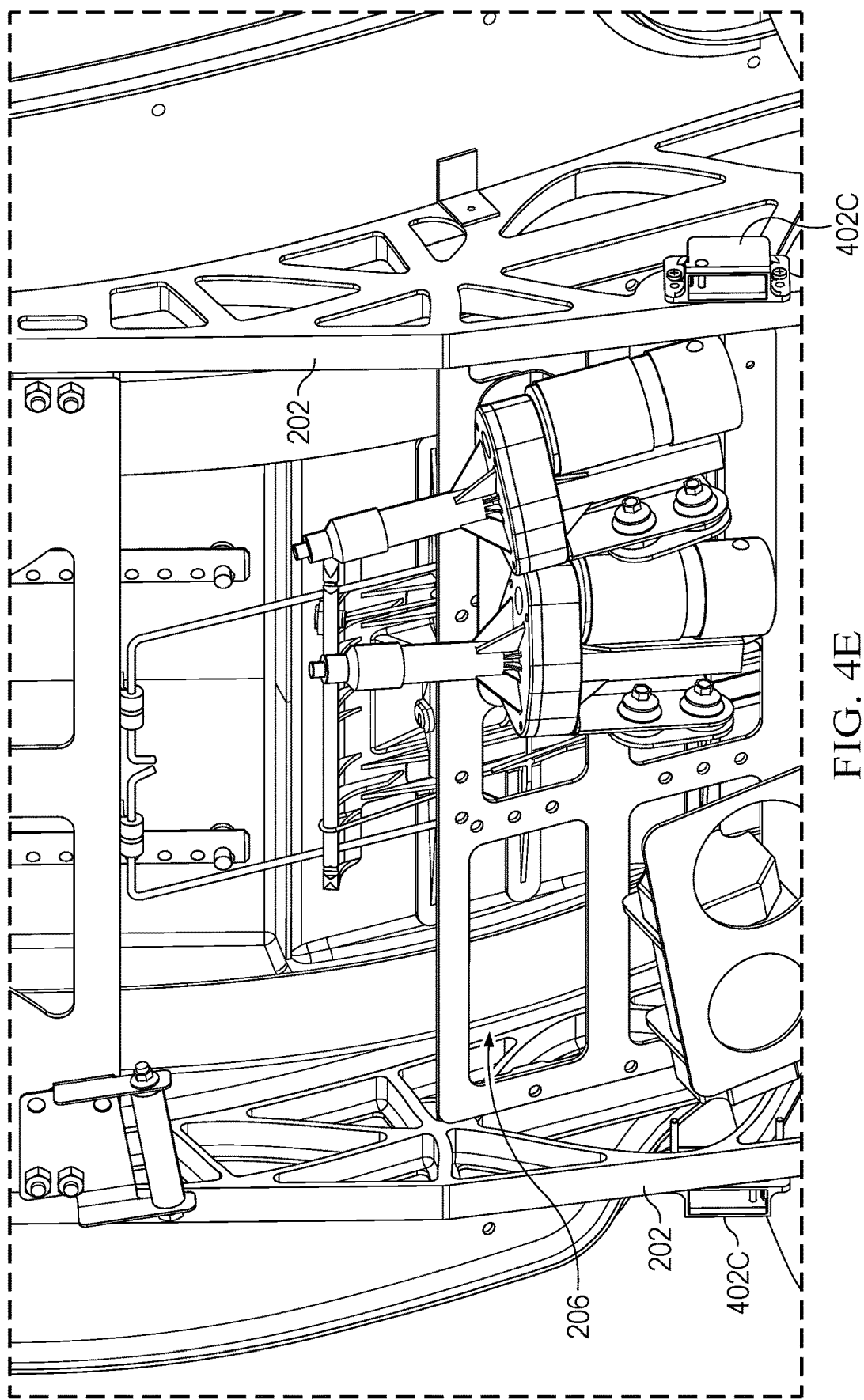

FIG. 4C is a perspective view of the seat back interior region 206 illustrating receiver portions 402A-402C according to some embodiments. FIG. 4D is a perspective view of the seat back interior region 206 illustrating upper receiver portions 402A and middle receiver portions 402B according to some embodiments. FIG. 4E is a perspective view of the seat back interior region 206 illustrating lower receiver portions 402C according to some embodiments. In some embodiments, two upper receiver portions 402A may be side-mounted to a substantially lateral surface of the lateral support 204 so that long axes of the upper receiver portion 402A extend from nearest a first vertical support 202 towards a second vertical support 202. Additionally, in some embodiments, the seat system 100 may have two vertical supports 202, and each vertical support 202 may have a middle receiver portion 402B and a lower receiver portion 402C side mounted to an outside surface. In some embodiments, the receiver portions 402A-402C being side mounting to a respective mounting surface may permit adjustment of the height at which a seat back panel is retained from the support elements 202, 204. This may permit adjustment of the stand-off distance, or height at which the seat back panel is retained from the seat back element 102, so that a covering, such as a leather, cloth, vinyl or other flexible material may be me wrapped around the seat back panel, with the seams inside the seat back panel to provide a seamless and unitary visual presentation. The adjustability of the stand-off distance permits adjustment of the gap between front edge portion 308 of the seat back panel 106 and the seat back front element 108. Similarly, face mounting the connectors to the mounting features permits adjustment of the connectors laterally and vertically so that the seat back panel may be aligned with respect to the supports 202, 204 when mounted.

Figure 5:
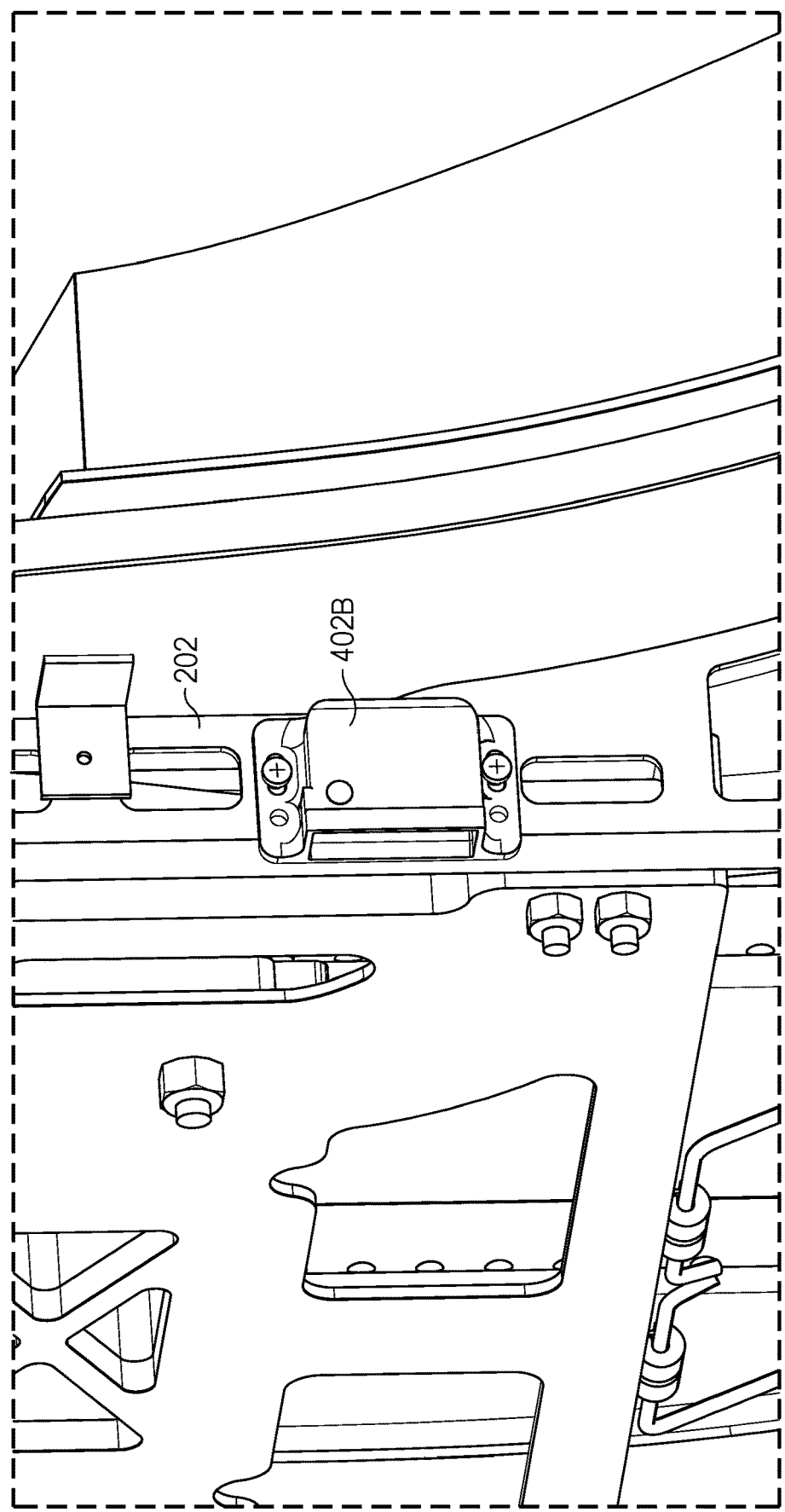
FIG. 5 is a perspective view illustrating a middle receiver portion according to some embodiments.

FIG. 5 is a perspective view illustrating a middle receiver portion 402B according to some embodiments. In some embodiments, side mounting the receiver portions may include mounting the receiver portion using screws, bolts, or other removeable fasteners, so that the depth of the receiver portions with maybe adjusted with respect to the seat back panel, when installed. For example, the illustrated middle receiver portion is mounted to the vertical support 202 using screws extending though slots in a backing plate to permit adjustment of the middle receiver portion 402B position.

Figure 6A:
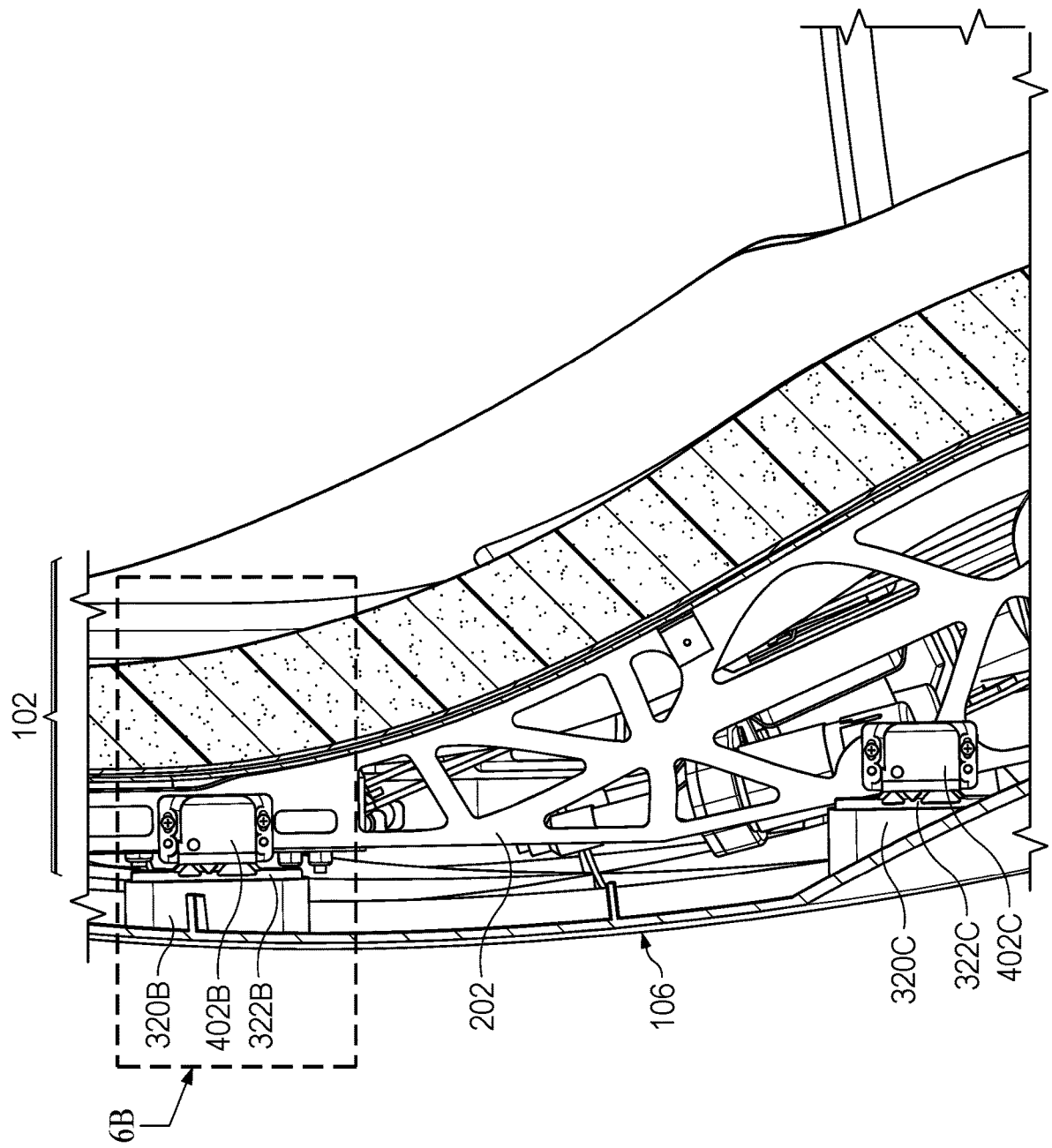
FIGS. 6A-6B are cutaway views of a seat system illustrating attachment of a seat back panel according to some embodiments.
Figure 6B:
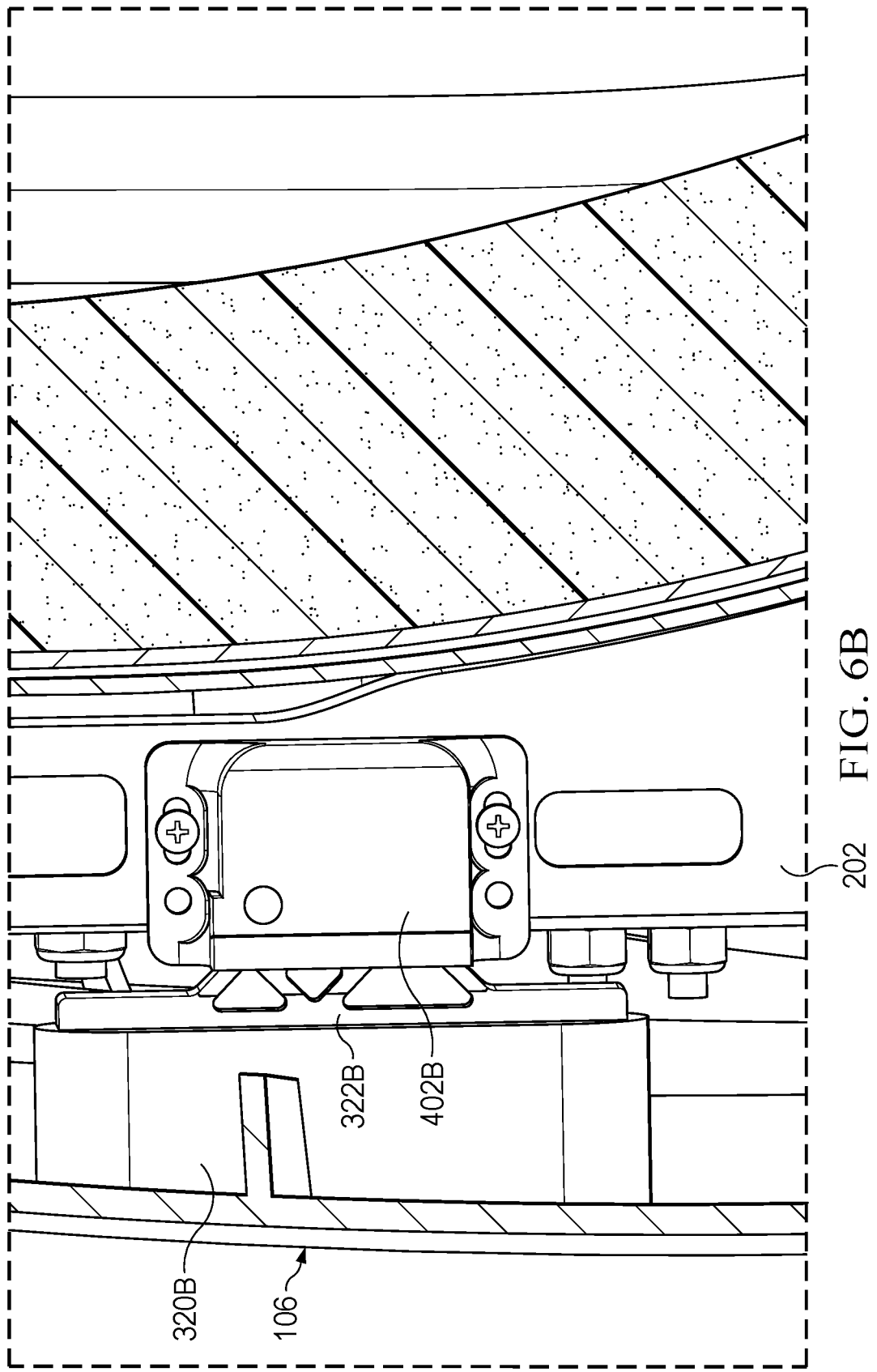

FIGS. 6A-6B are cutaway views of a seat system illustrating attachment of a seat back panel according to some embodiments. FIG. 6A is a cutaway view of a seat system illustrating the seat back panel 106 attached to the seat back element 102 according to some embodiments. FIG. 6B is a cutaway view of a seat system illustrating a close up of a middle connector portion 322B engaged with the middle receiver portion 402B according to some embodiments. In some embodiments, the connector portions 322B-322C and receiver portions 402B-402C may be arranged so that each of the connector portions 322B-322C are aligned directly across from the respective receiver portions 402B-402C. In some embodiments, this alignment permits the seat back panel 106 to be attached to the seat back element 102 by moving the seat back panel 106 straight toward the seat back element 102 due to the linear insertion characteristics of a grabber or cam-latch mechanism. Additionally, the connector portions 322B-322C face in substantially the same first direction, and the receiver portions 402B-402C face in substantially the same second direction, so that insertion axes of the connector portions 322A-322C into the receiver portions 402A-402C are substantially parallel.

In some embodiments, each receiver portion 402A-402C retains, when engaged, a corresponding connector portion 322A-322C within an opening in the receiver portion 402A-402C. Additionally, in some embodiments, the receiver portions 402A-402C retain the connector portions 322A-322C with a force of between about 1 pound and about 5 pounds, and in some embodiments, retain the connector portions 322A-322C with a force of about 3 pounds.

The use of a grabber mechanism may also permit the use of a push-to-release removal technique, where the portion of the seat back panel 106 adjacent to the respective connector portions 322A-322C is pushed, and the grabber mechanism releases so that the connector portion 322A-322C is removeable from the receiver portion 402A-402C. Similarly, the seat back panel 106 may be mounted to the seat back element 102 by aligning the connector portions 322A-322C with respective receive portions 402A-402C, and pushing at least a part of the connector portion into the corresponding receiver portion until the catch mechanism catches and retains the connector portion 322A-322C in the receiver portion 402A-402C.

An embodiment seat system includes a seat back element including seat back front portion, a vertical support disposed in a seat back interior region, where the vertical support supports the seat back front portion, and one or more first connector portions attached to the vertical support and aligned in a first direction. The seat system further has a seat back panel having one or more second connector portions attached to an interior surface and configured to connect to the one or more first connector portions, where the seat back panel has a first sidewall disposed at a first side and further has a second sidewall disposed on at a second side opposite the first side, where the first sidewall and the second sidewall each extend away from an interior surface of the seat back panel, where the seat back panel further has an upper wall portion disposed at a third side between the first sidewall and the second sidewall and forming a contiguous first surface with the first sidewall and second sidewall, where the first side, the second side, the third side, and a lower edge portion bound a center portion of the seat back panel, where the contiguous first surface and the center portion form a contiguous second surface that is free of openings and that at least partially bounds an interior cavity of the seat back panel. The second connector portions are configured to connect to the one or more first connector portions to attach the seat back panel to the seat back element with at least a portion of the vertical support in the interior cavity of the seat back panel.

In some embodiments, the seat system further has a lateral support attached to the vertical support, and one or more third connector portions attached to the lateral support and aligned in a second direction different from the first direction, where the one or more second connector portions are further configured to connect to the one or more third first connector portions. In some embodiments, the seat back further has one or more mounting surfaces disposed on the interior surface, and where the one or more second connector portions are face mounted to the one or more mounting surfaces. In some embodiments, the seat back further has one or more bosses extending therefrom, and where the one or more mounting surfaces are faces of the one or more bosses. In some embodiments, the one or more first connector portions and one or more third connector portions are first grabber connector portions of grabber catch mechanisms, and where the one more second connector portions are second grabber connector portions of the grabber catch mechanisms, and where insertion axes of the first grabber connector portions into respective ones of the second grabber connector portions are substantially parallel. In some embodiments, the seat system further has a lower back panel disposed on a lower portion of the seat and attached to a non-reclinable portion of the seat system, where the seat back element is reclinable, where the second connector portions are configured to connect to the one or more first connector portions to attach the seat back panel to the seat back element with the seat back panel be spaced apart from the lower back panel and is configured to hold the seat back panel over the lower back panel without contacting the lower back panel when the seat back element is reclined. In some embodiments, the seat system further has armrests disposed on opposing sides of the seat back element, where at least a portion of the seat back element extends to between the armrests, and where at least a portion of the seat back panel extends to between the armrests.

In some embodiments, the seat back panel has extension regions that extend over top surfaces of the armrests.

An embodiment seat back panel includes a center portion, mounting surfaces disposed on an interior surface of the center portion, a first sidewall disposed at a first side of the center portion, a second sidewall disposed at a second side of the center portion opposite the first side, where the first sidewall and the second sidewall each extend away from the interior surface of the seat back panel, an upper wall portion disposed at a third side of the center portion and between the first sidewall and the second sidewall and forming a contiguous first surface with the first sidewall and second sidewall, where the first side, the second side, the third side, and a lower edge portion of the center portion bound the center portion, where the contiguous first surface and the center portion form a contiguous second surface that is free of openings and that at least partially bounds an interior cavity disposed at the interior surface, and connector portions of attachment structures attached to the mounting surfaces and configured to connect to respective receiver portions of the attachment structures disposed on a seat structure to attach the seat back panel to a seat back element of the seat structure with at least a portion of a vertical support of the seat structure in the interior cavity of the seat back panel.

In some embodiments, the seat back panel has extension regions that extend outward, from the center of the center portion, past lower sidewall portions of the first and second sidewalls. In some embodiments, a portion of the center portion between the lower sidewall portions is configured to extend to between extend disposed on opposing sides of the seat structure with the extension regions above top surfaces of armrests of the seat structure. In some embodiments, a first panel region disposed between the lower sidewall portions is narrower than a second panel region disposed between the extension regions. In some embodiments, the seat back panel has bosses extending from the interior surface, where the mounting surfaces are faces of the bosses. In some embodiments, the connector portions are first grabber connector portions of grabber catch mechanisms, and where the receiver portions are second grabber connector portions of the grabber catch mechanisms, and where insertion axes of the first grabber connector portions into respective ones of the second grabber connector portions are substantially parallel. In some embodiments, the seat back panel is formed from a thermoplastic, and the seat back panel is between about 24 inches high and about 36 inches high, and the seat back panel us between about 18 inches wide and about 28 inches wide.

An embodiment method for installing a seat back panel includes providing a seat back panel having mounting surfaces disposed on an interior surface of a center portion of the seat back panel, and further having connector portions of attachment structures attached to the mounting surfaces and configured to connect to receiver portions of the attachment structures disposed on a seat structure, where the seat back panel further has a first sidewall disposed at a first side of the center portion, where the seat back panel further has a second sidewall disposed on at a second side of the center portion the opposite the first side, where the first sidewall and the second sidewall each extend away from the interior surface of the seat back panel, where the seat back panel further has an upper wall portion disposed at a third side of the center portion and between the first sidewall and the second sidewall and forming a contiguous first surface with the first sidewall and second sidewall, where the first side, the second side, the third side, and a lower edge portion of the center portion bound the center portion, where the contiguous first surface and the center portion form a contiguous second surface that is free of openings and that at least partially bounds an interior cavity disposed at the interior surface, aligning the seat back panel with the seat structure and with each connector portion of the connector portions aligned with a respective receiver portion of the receiver portions, and attaching the seat back panel to a seat back element of the seat structure by moving the seat back panel to the seat back element and causing the connector portions to engage with the receiver portions, and where the connector portions engaging with the receiver portions causes the receiver portions to latch the connector portions and retain the seat back panel on the back of the seat back element with at least a portion of the seat back element in the interior cavity of the seat back panel.

In some embodiments, the connector portions are first grabber connector portions of grabber catch mechanisms, and where the receiver portions are second grabber connector portions of the grabber catch mechanisms, where insertion axes of the first grabber connector portions into respective ones of the second grabber connector portions are substantially parallel. In some embodiments, the seat structure further has a lower back panel disposed on a lower portion of the seat structure and attached to a non-reclinable portion of the seat structure, where the seat back element is reclinable, where the attaching the seat back panel to the seat back element includes connecting connector portions to attach the seat back panel to the seat back element with the seat back panel over the lower back panel and spaced apart from the lower back panel without contacting the lower back panel when the seat back element is reclined. In some embodiments, the seat structure includes armrests disposed on opposing sides of the seat back element, where the attaching the seat back panel to the seat back element includes placing at least a portion of the seat back panel between the armrests. In some embodiments, the seat back panel has extension regions, and the attaching the seat back panel to the seat back element includes placing the seat back panel with the extension regions over top surfaces of the armrests.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A seat system, comprising:
   a seat back element comprising:
   seat back front portion;
   a vertical support disposed in a seat back interior region, wherein the vertical support supports the seat back front portion; and
   one or more first connector portions attached to the vertical support and aligned in a first direction; and
   a seat back panel having one or more second connector portions attached to an interior surface and configured to connect to the one or more first connector portions;
   wherein the seat back panel has a first sidewall disposed at a first side and further has a second sidewall disposed at a second side opposite the first side, wherein the first sidewall and the second sidewall each extend away from an interior surface of the seat back panel, wherein the seat back panel further has an upper wall portion disposed at a third side between the first sidewall and the second sidewall and forming a contiguous first surface with the first sidewall and second sidewall, wherein the first side, the second side, the third side, and a lower edge portion bound a center portion of the seat back panel, wherein the contiguous first surface and the center portion form a contiguous second surface that is free of openings and that at least partially bounds an interior cavity of the seat back panel;
   wherein the seat back panel has a plurality of raised elements extending from the interior surface of the seat back panel and extending into the interior cavity of the seat back panel, wherein each raised element of the plurality of raised elements has a mounting surface that is an outermost surface of the respective raised element and that faces away from the interior surface;
   wherein each second connector portion of the one or more second connector portions is surface mounted to a respective mounting surface of a respective raised element with the entirety of the respective second connector portion being exterior to the respective raised element;
   wherein the one or more second connector portions comprise at least one first back panel connector portion and at least one second back panel connector portion, and wherein each first back panel connector portion of the at least one first back panel connector portion has a long axis that is aligned at a substantially right angle to a long axis of each second back panel connector portion of the at least one second back panel connector portion; and
   wherein the second connector portions are configured to connect to the one or more first connector portions to attach the seat back panel to the seat back element with at least a portion of the vertical support in the interior cavity of the seat back panel.

2. The seat system of claim 1, wherein the seat back element further comprises:
   a lateral support attached to the vertical support; and
   one or more third connector portions attached to the lateral support and aligned in a second direction different from the first direction;
   wherein the one or more second connector portions are further configured to connect to the one or more third connector portions.

3. The seat system of claim 2, wherein the one or more first connector portions and one or more third connector portions are first grabber connector portions of grabber catch mechanisms, and wherein the one or more second connector portions are second grabber connector portions of the grabber catch mechanisms; and
   wherein insertion axes of the first grabber connector portions into respective ones of the second grabber connector portions are substantially parallel.

4. The seat system of claim 1, further comprising a lower back panel disposed on a lower portion of the seat and attached to a non-reclinable portion of the seat system;
   wherein the seat back element is reclinable; and
   wherein the second connector portions are configured to connect to the one or more first connector portions to attach the seat back panel to the seat back element with the seat back panel spaced apart from the lower back panel and is configured to hold the seat back panel over the lower back panel without contacting the lower back panel when the seat back element is reclined.

5. The seat system of claim 1, further comprising armrests disposed on opposing sides of the seat back element, wherein at least a portion of the seat back element extends to between the armrests, and wherein at least a portion of the seat back panel extends to between the armrests.

6. The seat system of claim 5, wherein the seat back panel has extension regions that extend over top surfaces of the armrests.

7. A seat back panel, comprising:
   a center portion, wherein the center portion has a plurality of raised elements extending from an interior surface of the seat back panel and extending into an interior cavity of the seat back panel, wherein each raised element of the plurality of raised elements has a mounting surface that is an outermost surface of the respective raised element and that faces away from the interior surface;
   mounting surfaces disposed on an interior surface of the center portion;
   a first sidewall disposed at a first side of the center portion;
   a second sidewall disposed at a second side of the center portion opposite the first side, wherein the first sidewall and the second sidewall each extend away from the interior surface of the seat back panel;
   an upper wall portion disposed at a third side of the center portion and between the first sidewall and the second sidewall and forming a contiguous first surface with the first sidewall and second sidewall, wherein the first side, the second side, the third side, and a lower edge portion of the center portion bound the center portion, wherein the contiguous first surface and the center portion form a contiguous second surface that is free of openings and that at least partially bounds an interior cavity disposed at the interior surface; and
   connector portions that are of attachment structures attached to the mounting surfaces and that are configured to connect to respective receiver portions of the attachment structures disposed on a seat structure to attach the seat back panel to a seat back element of the seat structure with at least a portion of a vertical support of the seat structure in the interior cavity of the seat back panel, wherein each connector portion of the connector portions is surface mounted to a respective mounting surface of a respective raised element with the entirety of the respective connector portion being exterior to the respective raised element;
   wherein the connector portions comprise at least one first connector portion and at least one second connector portion, and wherein each first connector portion of the at least one first connector portion has a long axis that is aligned at a substantially right angle to a long axis of each second connector portion of the at least one second connector portion.

8. The seat back panel of claim 7, wherein the seat back panel has extension regions that extend outward, from the center of the center portion, past lower sidewall portions of the first and second sidewalls.

9. The seat back panel of claim 8, wherein a portion of the center portion between the lower sidewall portions is configured to extend between lower sidewall portions disposed on opposing sides of the seat structure with the extension regions above top surfaces of the armrests of the seat structure.

10. The seat back panel of claim 8, wherein a first panel region disposed between the lower sidewall portions is narrower than a second panel region disposed between the extension regions.

11. The seat back panel of claim 7, wherein the connector portions are first grabber connector portions of grabber catch mechanisms, and wherein the receiver portions are second grabber connector portions of the grabber catch mechanisms; and wherein insertion axes of the first grabber connector portions into respective ones of the second grabber connector portions are substantially parallel.

12. The seat back panel of claim 7, wherein the seat back panel is formed from a thermoplastic, and wherein the seat back panel is between about 24 inches high and about 36 inches high, and wherein the seat back panel is between about 18 inches wide and about 28 inches wide.

13. A method for installing a seat back panel, comprising:
providing a seat back panel having mounting surfaces disposed on an interior surface of a center portion of the seat back panel a plurality of raised elements extending from an interior surface of the seat back panel and extending into an interior cavity of the seat back panel, wherein each raised element of the plurality of raised elements has a mounting surface that is an outermost surface of the respective raised element and that faces away from the interior surface, and further having connector portions that are of attachment structures attached to the mounting surfaces and that are configured to connect to receiver portions of the attachment structures disposed on a seat structure, wherein each connector portion of the connector portions is surface mounted to a respective mounting surface of a respective raised element with the entirety of the respective connector portion being exterior to the respective raised element, wherein the connector portions comprise at least one first connector portion and at least one second connector portion, and wherein each first connector portion of the at least one first connector portion has a long axis that is aligned at a substantially right angle to a long axis of each second connector portion of the at least one second connector portion, wherein the seat back panel further has a first sidewall disposed at a first side of a center portion of the seat back panel, wherein the seat back panel further has a second sidewall disposed at a second side of the center portion the opposite the first side, wherein the first sidewall and the second sidewall each extend away from the interior surface of the seat back panel, wherein the seat back panel further has an upper wall portion disposed at a third side of the center portion and between the first sidewall and the second sidewall and forming a contiguous first surface with the first sidewall and second sidewall, wherein the first side, the second side, the third side, and a lower edge portion of the center portion bound the center portion, wherein the contiguous first surface and the center portion form a contiguous second surface that is free of openings and that at least partially bounds an interior cavity disposed at the interior surface;

aligning the seat back panel with the seat structure and with each connector portion of the connector portions aligned with a respective receiver portion of the receiver portions; and attaching the seat back panel to a seat back element of the seat structure by moving the seat back panel to the seat back element and causing the connector portions to engage with the receiver portions, and wherein the connector portions engaging with the receiver portions causes the receiver portions to latch the connector portions and retain the seat back panel on the back of the seat back element with at least a portion of the seat back element in the interior cavity of the seat back panel.

14. The method of claim 13, wherein the connector portions are first grabber connector portions of grabber catch mechanisms, and wherein the receiver portions are second grabber connector portions of the grabber catch mechanisms; and wherein insertion axes of the first grabber connector portions into respective ones of the second grabber connector portions are substantially parallel.

15. The method of claim 13, wherein the seat structure further has a lower back panel disposed on a lower portion of the seat structure and attached to a non-reclinable portion of the seat structure;

wherein the seat back element is reclinable; and wherein the attaching the seat back panel to the seat back element comprises connecting connector portions to attach the seat back panel to the seat back element with the seat back panel over the lower back panel and spaced apart from the lower back panel without contacting the lower back panel when the seat back element is reclined.

16. The method of claim 13, wherein the seat structure comprises armrests disposed on opposing sides of the seat back element; and wherein the attaching the seat back panel to the seat back element comprises placing at least a portion of the seat back panel between the armrests.

17. The method of claim 16, wherein the seat back panel has extension regions; and wherein the attaching the seat back panel to the seat back element comprises placing the seat back panel with the extension regions over top surfaces of the armrests.

* * * * *